United States Patent

[11] 3,579,981

[72] Inventor Leonard P. Gau
  Birmingham, Mich.
[21] Appl. No. 35,051
[22] Filed May 6, 1970
[45] Patented May 25, 1971
[73] Assignee Chrysler Corporation
  Highland Park, Mich.
  Continuation-in-part of application Ser. No.
  802,944, Feb. 27, 1969, now abandoned.

[54] ANTI-POLLUTION EXHAUST VALVE COMBINATION WITH FLUIDIC CONTROL AND VALVE COOLING FEATURES
9 Claims, 8 Drawing Figs.

[52] U.S. Cl. .................................................... 60/29, 123/119A
[51] Int. Cl. ...................................................... F01n 3/00
[50] Field of Search .......................................... 60/29, 30; 123/119 (A)

[56] References Cited
FOREIGN PATENTS
818,457  6/1937  France .................... 60/29

Primary Examiner—Douglas Hart
Attorney—Talburtt and Baldwin

ABSTRACT: Several embodiments showing collector arrangements disposed about exhaust valves in the cylinder head of internal combustion engines for collecting at least part of the unburned hydrocarbons from the engine exhaust. Fluidic deflection control ports are included in some embodiments to provide directional control over the flow of exhaust gases and cooling of the valves.

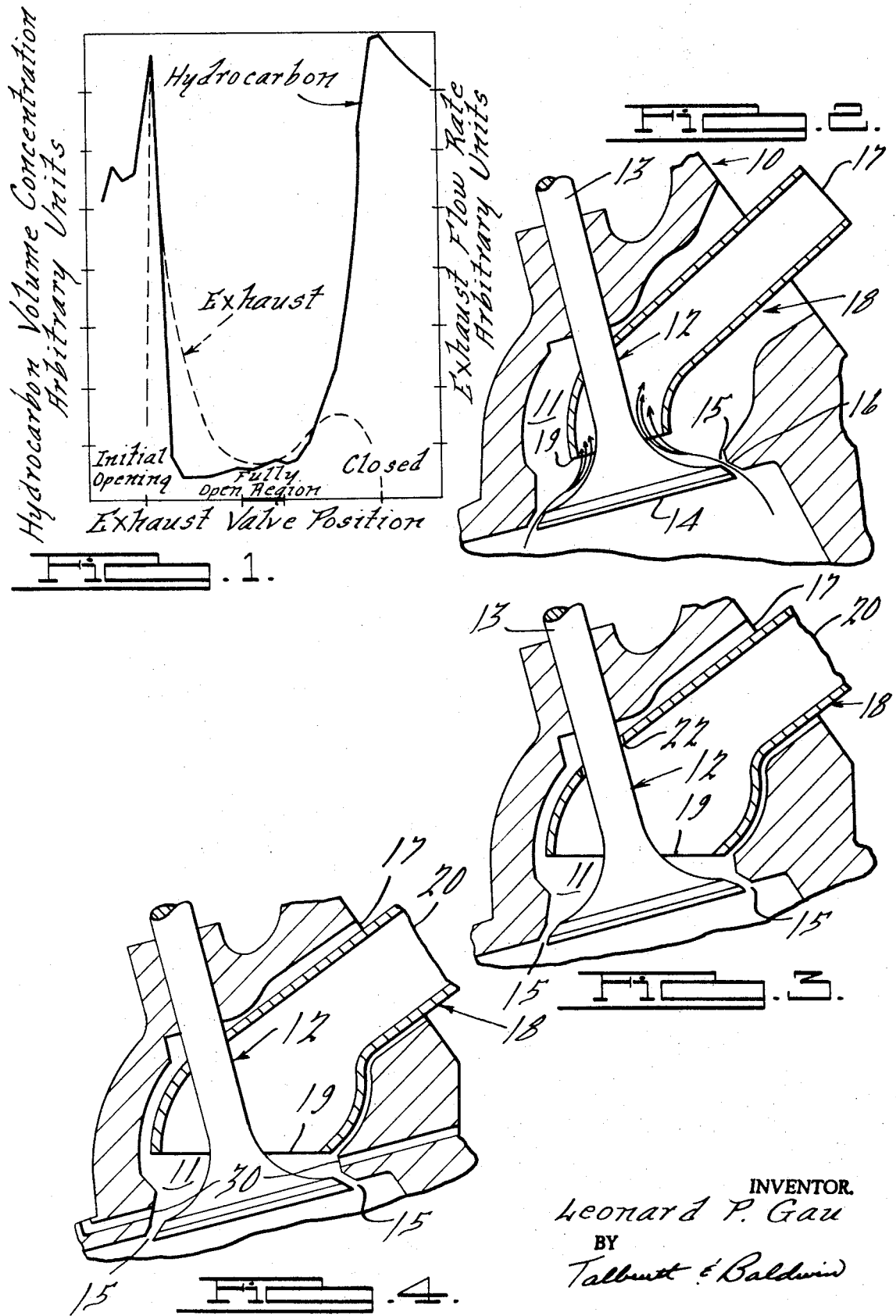

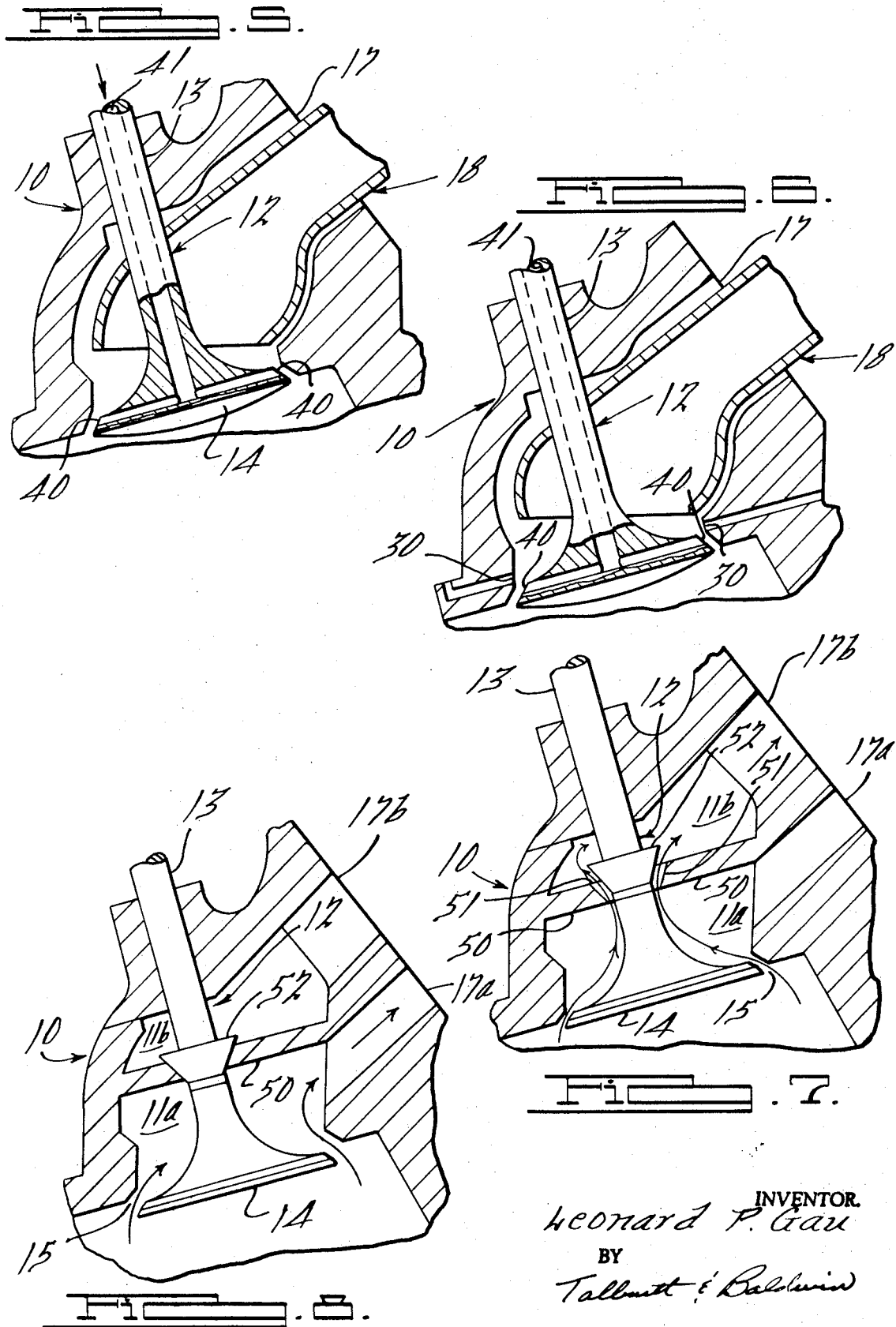

ANTI-POLLUTION EXHAUST VALVE COMBINATION WITH FLUIDIC CONTROL AND VALVE COOLING FEATURES

CROSS-REFERENCE

This is a Continuation-In-part of application Ser. No. 802,944 filed Feb. 27, 1969, now abandoned. It is assigned to the same assignee as was the parent application.

BACKGROUND

Many efforts have been made in recent years to decrease the amount of air pollution. Internal combustion engines contribute to the pollution problem be the substances emitted in their exhaust. Most of these substances consist of unburned hydrocarbons. This invention broadly relates to an exhaust valve arrangement for decreasing the amount of unburned hydrocarbons exhausted into the atmosphere by internal combustion engines, particularly automobile engines.

SUMMARY OF THE INVENTION

The invention provides an arrangement including two exhaust collector means which are operative in combination to separate and collect portions of the unburned hydrocarbons from the rest of the exhaust gases. Collection of these hydrocarbons may be facilitated by the incorporation of deflection control ports in various parts of of the exhaust valve arrangement for selectively directing the flow of exhaust gases into or away from the collector means. The control ports also provide cooling of the exhaust valve by their deflection of the hot exhaust gases.

BRIEF DESCRIPTION OF THE FIGURES

FIG. 1 is a graph in which the solid line shows the variation of the hydrocarbon concentration in the exhaust gases at various times during the exhaust valve stroke of an internal combustion engine. The broken line is representative of the exhaust flow rate at various times during the exhaust valve stroke.

FIG. 2 is a sectional view of a cylinder head and a partially open exhaust valve including an embodiment of a hydrocarbon collector means according to one form of this invention.

FIG. 3 is a view, similar to that of FIG. 2, illustrating an alternate embodiment of the invention.

FIG. 4 is a view, similar to that of FIG. 2, illustrating another modified hydrocarbon collector means and including deflection control ports in the exhaust chamber wall.

FIG. 5 is a view, similar to FIG. 4, illustrating an embodiment of the invention utilizing deflection control ports in the valve.

FIG. 6 is a view, similar to FIGS. 4 and 5, illustrating an embodiment of the invention which combines the features of the embodiments shown in those FIGS.

FIG. 7 is a sectional view of a cylinder head and partially open exhaust valve including another hydrocarbon collector arrangement in accordance with the invention.

FIG. 8 is a view of the same arrangement shown in FIG. 7 with the exhaust valve fully open.

DESCRIPTION OF THE PREFERRED EMBODIMENTS

In the graph of FIG. 1 the solid line shows the variation in the hydrocarbon content of exhaust gases during different periods of the exhaust valve stroke for a typical internal combustion engine. The graph indicates that the hydrocarbon concentration is high during the beginning and end parts of the stroke and at a minimum during the intermediate part. That is, the unburned hydrocarbons seem to appear in the exhaust at the time when the exhaust valve is just beginning to open and when it is closing. When the valve is fully open the hydrocarbon content of the exhaust gas is minimal.

However, the solid line tells only part of the story. The broken line shows that the rate of flow for a given "charge" of exhaust gas of given value resulting from any one combustive event in an engine combustion chamber varies from an extremely high rate when the valve first opens to a low rate when the valve closes. It follows that a relatively large volume of exhaust gas is discharged early in the valve cycle when the flow rate is very high, as shown by the dotted line to the left side of the graph, as compared to that which is discharged at the end of the cycle, as shown by the low portion of the dotted line to the right side of the graph. Therefore, volumetrically, most of the exhaust passes through the exhaust valve early in the cycle soon after the valve opens.

However, most of the total hydrocarbons are believed to exist in the relatively low volume tag end portion, generally that portion which flows during the interval under the dotted line between "fully open" and "closed" on the graph. In other words, although high hydrocarbon concentrations are indicated by the solid line at the left and right sides of the graph, more of the hydrocarbons from the total volume standpoint are contained in the last low volume portion of the exhaust.

This is perhaps more explainable when one reviews the combustion process in an engine combustion chamber. It is known that the hydrocarbons favor the low temperature areas in the cylinder. When a fuel charge is combusted, the hydrocarbons are formed primarily along the cylinder wall and not at the center or top of the cylinder where the temperatures are highest.

When the exhaust valve opens, the high temperature exhaust gas, actually low in hydrocarbon content, is exhausted first at a high rate. This is indicated by the rapidly rising dotted line to the left side of the graph. However, the pressure released when the exhaust valve opens is quickly dissipated as indicated by the rapid drop in the dotted line progressing from the high point at the left to the low point at the "fully open region" of the graph. At this point, the piston starts upward on the exhaust stroke. It "scrapes" the hydrocarbons from the cylinder wall and pushes them through the valve as indicated by the remaining part of the dotted line where the flow rate increases a slight amount.

When the valve closes, hydrocarbon-rich exhaust is still passing out of the cylinder. Upon closing of the valve, the very last part of the hydrocarbon-rich gas to pass through the valve "bogs down" in the region adjacent the downstream side of the valve because there is no force available to cause it to move once the valve has closed.

It is therefore believed that the data represented by the solid line to the left side of the graph is somewhat misleading. The measurements for this data were made by measuring the hydrocarbon concentration in the region immediately adjacent the downstream side of the valve. What was in fact measured was the hydrocarbon-rich remains of a preceding cycle. Thus, each cycle does not begin with a hydrocarbon-rich portion of exhaust being discharged; the hydrocarbons in the exhaust are primarily contained in the last portions of the exhaust discharged during each cycle.

In view of the above, if one can selectively control the latter portion of the exhaust gas or a part thereof, one will control the hydrocarbon-rich part of the exhaust. It can be recycled to held control $NO_x$, or directed to an afterburner while the less noxious part of the exhaust can be released.

As a concomitant to the above, it has been discovered through a study of the flow phenomena surrounding exhaust valves that the flow of exhaust gas through the valve is different when the valve is partially open, as at the beginning and end of the stroke, then when the valve is substantially fully open as in the middle of the stroke. Since these differences correspond to the times when the hydrocarbons are substantially present (end of cycle) and absent (beginning and middle of cycle) in the exhaust, an opportunity is provided for their separation from the remainder of the exhaust gases.

Specifically, it has been observed that a converging annular flow of exhaust gases through the exhaust valve inlet port and about the upper surface of the valve exists when the valve is partially open. It does not exist when the valve is substantially fully open. Furthermore, this collimated flow condition is accentuated during the early and late parts of the exhaust valve stroke causing "wall attachment" of the exhaust gases. The wall attached flow breaks up when the valve is substantially fully open. Both phenomena are used by this invention to achieve separation of at least a portion of the unburned hydrocarbons from the other exhaust gases.

The structural aspects of the invention may be more clearly illustrated with reference to FIG. 2 of the drawing which shows a portion of a cylinder head, generally designated 10, provided with a first exhaust collector means, such as an exhaust chamber 11. Cylinder head 10 is adapted to seat upon a gasket secured between an engine block and the cylinder head in the usual manner (gasket and block not shown). Associated with cylinder head 10 is an exhaust valve 12 including a valve stem 13 and valve head 14. Exhaust valve head 14 is adapted to close a first inlet port, such as the annular exhaust valve inlet port 15, by closing against a valve seat 61 formed in the cylinder head. Valve stem 13 extends through exhaust valve chamber 11 and through the upper portion of head 10 where it may be adapted for operation in the usual manner. Cylinder head 10 also includes a first outlet port, such as exhaust outlet port 17, through which exhaust gases may leave chamber 11.

A second exhaust collector means, which in this embodiment is a conduit means such as a pipe 18 or the like, is included in exhaust chamber 11 with a second inlet port or open end 19 disposed about valve stem 13, preferably coaxially as shown. The other end of the collector may emerge from cylinder head 10 through the exhaust outlet port 17 and terminate in a second outlet port 20. Suitable connections may be made to outlet ports 17 and 20 to control and direct the gases emerging therefrom.

Since the open end of pipe 18 is disposed about valve stem 13 within chamber 11, it can readily be seen that the inlet ports of the two exhaust collector means are arranged with respect to each other so that is is necessary for the exhaust gases to enter chamber 11 before they are in a position from which it is possible to flow through the inlet port of the second collector means. With an arrangement of this type, the separation of at least a relatively large portion of the hydrocarbons from the rest of the exhaust gases may be accomplished with the embodiment of FIG. 2 as explained below.

When valve 12 is only partially open as shown in FIG. 2, the gas flow through exhaust inlet port 15 is focused toward the lower part of valve stem 13. The flow phenomenon known as "wall attachment" results, due to focusing and entrainment of the gases, causing them to cling to valve stem 13 and flow upwardly along its surface. This tendency is especially strong when the valve opening is small and the gas velocity is high, such as when the valve is just opening. Due to the preferential flow of the initial burst of exhaust gas up valve stem 13, it is directed into the second inlet port or open end 19 of collector pipe 18 as indicated by the arrows. As a result, the initial burst of the exhaust, which enters exhaust chamber 11 when valve 12 is opening, is kept separate from the hydrocarbon-rich remanent from the previous cycle sitting in chamber 11.

When the valve is substantially fully open, the wall attached flow has ceased and the exhaust gases flow through the exhaust port 15. In rough proportion, about half the gas passes through exhaust chamber 11 and out exhaust valve outlet port 17 while the remainder enters inlet port 19 to pass through collector pipe 18 and out outlet port 20.

During this period when the exhaust flow is into both chamber 11 and conduit 18, the piston begins its upward stroke and forces the hydrocarbon-rich exhaust through the valve. The hydrocarbon-rich remnants are swept through chamber 11 and out of outlet 17 along with a portion of the hydrocarbon-rich exhaust of the then present cycle. Conduit connections made to outlet 17 (not shown) would receive this gas and it could be recirculated to affect $NO_x$ formation or passed to a thermal or catalytic afterburner as desired. The proportion of hydrocarbon-rich gas passing into the collector pipe 18 compared to the amount passing through chamber 11 may be favorably influenced for greater collection by making the inlet port 19 as small as possible.

TABLE I

| Fuel | Φ [1] | Duct | Percent $O_2$ | hc, p.p.m.[2] | $NO_x$ p.p.m. | Percent $CO$ | Percent $CO_2$ | hc i/o ratio[3] | hc percent |
|---|---|---|---|---|---|---|---|---|---|
| I[4] | 1.2 | i | 0.8 | 393 | 253 | 8.00 | 9.85 | 4:5 | 0.80 |
| | 1.2 | o | 0.9 | 490 | 232 | 7.81 | 8.50 | | |
| I | 1.01 | o | 1.5 | 329 | 1361 | 0.67 | 13.65 | 5:8 | 0.63 |
| | 1.01 | i | 1.6 | 209 | 1361 | 0.62 | 11.40 | | |
| I | 0.87 | i | 3.8 | 135 | 602 | 0.37 | 10.80 | 5:9 | 0.56 |
| | 0.87 | o | 4.1 | 240 | 568 | 0.33 | 10.40 | | |

[1] Value of 1.00=Stoichiometric, anything less or more is lean or rich, respectively.
[2] hc=Hydrocarbon.
[3] i=Inside duct (collector pipe 18); o=outside duct (chamber 11).
[4] Indolene fuel.

1. Indolene fuel
2. Value of 1.00 = stoichometric, anything less or more is lean or rich, respectively.
3. i–inside duct (collector pipe 18)
   o–outside duct (chamber 11)
4. hc–hydrocarbon Table I shows the results obtained from an arrangement of the type shown in FIG. 2. The three sets of data in the Table show that separation of the exhaust occurs and a larger proportion of the hydrocarbons are caused to flow through chamber 11 than through collector pipe 18.

The relative rolls of chamber 11 and collector pipe 18 may be easily reversed if desired. The embodiment shown in FIG. 3 is representative of such an arrangement. Two changes have been made in this structure relative to FIG. 2. First, a clearance 22 has been provided around the valve stem 13 and second, the bottom part of collector pipe 18 has been enlarged as will be explained herein below.

The operation of this embodiment is slightly different. When valve 12 is only partially open as shown in FIG. 3, the gas flow through exhaust inlet port 15 flows up the valve stem due to "wall attachment" as before. However, in this case, the gas follows the stem surface through clearance port 22 and reenters chamber 11. The clearance port around the valve stem is not critical as to size except that is should be small relative to the other openings to allow for the escape therethrough of collimated flow primarily. Clearance around the valve stem of 0.010 to about 0.030 inches is satisfactory. As the valve opens completely, "wall attachment" ceases and the gas flows into chamber 11 and collector pipe 18 without direction or control. As before, the hydrocarbon content of the exhaust is not maximum until the piston scrapes the hydrocarbons from the cylinder wall during its upward movement to push the gas through the valve. It is advantageous to make inlet port 19 relatively large as shown in the FIG. to assure the collection of as much of the gas as possible by collector pipe 18.

As the valve beings to close, "wall attachment" is initiated and the last portion of the exhaust is again caused to flow through clearance port 22 and back into chamber 11.

The ultimate result is the separation and collection of a relatively large portion of the hydrocarbons by collector pipe 18. In this instance, the exhaust exiting at outlet port 17 is relatively low in hydrocarbon content relative to that exiting at outlet port 20. Table II shows the results obtained from an arrangement of the type shown in FIG. 3.

TABLE II

| Fuel | Fuel/air ratio [1] | $\Phi$ [2] | Duct | Percent $O^2$ | hc- p.p.m.[3] | $NO_x$, p.p.m. | Percent CO | Percent $CO^2$ | hc i/o ratio | Relative hc, percent |
|---|---|---|---|---|---|---|---|---|---|---|
| I [4] | .089 | 1.2 | i [5] | 0.5 | 320 | 232 | 7.14 | 9.65 | 14:15 | 0.87 |
|  | .089 | 1.2 | o [5] | 0.6 | 369 | 232 | 7.30 | 9.15 |  |  |
| I | .068 | 1.01 | o | 0.8 | 228 | 1321 | 1.46 | 12.40 | 21:16 | 0.76 |
|  | .068 | 1.01 | i | 1.2 | 300 | 1463 | 1.67 | 12.30 |  |  |
| I | .058 | 0.87 | i | 4.0 | 343 | 440 | 0.42 | 10.90 | 10:7 | 0.70 |
|  | .058 | 0.87 | o | 4.2 | 240 | 317 | 0.30 | 10.7 |  |  |
| E [6] | .117 | 1.01 | o | 1.3 | 125 | 520 | 2.55 | 11.63 | 6:5 | 0.84 |
|  | .117 | 1.01 | i | 0.6 | 149 | 650 | 2.62 | 11.83 |  |  |
| E | .107 | 0.95 | i | 0.9 | 149 | 993 | 0.96 | 12.80 | 6:5 | 0.81 |
|  | .107 | 0.95 | o | 1.0 | 121 | 685 | 1.09 | 12.30 |  |  |
| E | .090 | 0.81 | o | 3.9 | 104 | 278 | 0.28 | 11.20 | 20:13 | 0.65 |
|  | .090 | 0.81 | i | 3.7 | 160 | 317 | 0.37 | 11.20 |  |  |

[1] Value of .068=Stoichiometric, anything less or more is lean or rich, respectively.
[2] Value of 1.00=Stoichiometric, anything less or more is lean or rich, respectively.
[3] hc=Hydrocarbon.
[4] Indolene fuel.
[5] i=inside duct (collector pipe 18); o=Outside duct (chamber 11).
[6] Ethanol fuel.

Referring now to FIG. 4, a further modified embodiment is shown incorporating a plurality of spaced fluidic deflection control ports 30, carried in the interior wall of cylinder head 10, for selectively directing the exhaust gas flow in chamber 11 and imparting selective control features to the combination. By means of the deflection control ports 30 a positive or negative pressure, relative to the pressure of the exhaust entering inlet port 15 and flowing over the surface of valve 12, may be used to establish or to reinforce the "wall attached" flow or to inhibit it thus aiding the separation of hydrocarbons from the exhaust. For example, the flow of a control fluid such as air, out of deflection ports 30 at the end of the exhaust valve stroke may be used to provide a relatively positive pressure which strengthens wall attachment and enhances flow into pipe 18. On the other hand, the application of a lower relative pressure, such as a vacuum or suction action at ports 30 during that portion of the cycle when the valve is opening or is substantially fully open may be used to produce a relatively negative pressure which tends to inhibit and breakup any "wall attached" flow about the valve, transferring it to the exhaust chamber walls and thus directing the exhaust through chamber 11. The application of the relative positive or negative pressures may be timed to occur in an automatic sequence if desired.

In the reverse, a negative pressure may be applied by deflection ports 30 during that portion of the cycle when the valve is closing thereby directing the flow of exhaust gases along the walls of exhaust chamber 11, where the flow becomes wall attached and flows out of outlet port 17. Positive pressure may be applied when the valve is opening in order to aid in the establishment of wall attached flow of the exhaust gases along the valve stem and into pipe 18.

Deflection ports 30 may vary in number from two to any plurality thereof and are preferably spaced circumferentially about the exhaust valve inlet port 15 just above the valve head as shown in FIG. 4. When only two deflection ports are used it is preferred that they be oppositely positioned with respect to each other as shown.

Referring now to FIG. 5, another embodiment is shown wherein deflection ports 40 are carried in head 14 of exhaust valve 12. A hollow valve stem 13 is used in this embodiment to communicate through the stem between open end 41 and deflection ports 40. The hollow stem "breathes" through open end 41 relieving the low pressure area at the valve surface and allowing the flow to detach itself from that surface. The effect may be controlled by opening or closing opening 41 at desired times by any suitable means (not showN).

In place of natural aspiration, positive or negative pressure may be applied through the hollow valve stem at suitable times. For example, a positive air pressure may be applied to create a deflection action at control ports 40 causing the flow to detach itself from the surface of the valve. The flow then tends to cling to the wall of the exhaust chamber and is more easily directed out the exhaust outlet port 17 in the conventional manner. The deflection pressure may be arranged to issue from control ports 40 in timed or automatic manner for selectively directing flow into pipe 18 or directly out of exhaust outlet port 17.

As before, deflection ports 40 may vary in number from two to any plurality thereof and are preferably spaced circumferentially about the periphery of valve head 14. If only two deflection ports are utilized they should be oppositely spaced with respect to each other as shown.

An additional advantage results from the arrangement shown in FIG. 5. The air, desirable for antipollution which is now conventionally pumped into this region, serves additional purposes when channeled through the valve. Separation of pollutants from the exhaust and air cooling of the valve are provided. As a result, much of the price penalty for air pumping is offset by enabling less costly materials to be used for the valves.

Reversal of the collecting functions of pipe 18 and chamber 11 as described in connection with FIG. 4 is possible with this embodiment. That is, a positive pressure at control ports 40 may be used to direct exhaust gases along the wall of chamber 11 and negative pressure at these ports may be used to direct the exhaust gases into pipe 18.

Referring to FIG. 6, an embodiment is shown which incorporates the various features of the embodiments described in connection with FIGS. 4 and 5. The overall operation of this embodiment is in accord with that described for the other two embodiments separately and need not be described here except to say that the deflection ports 30 in the cylinder head and deflection ports 40 in the valve head may be spaced opposite each other and operated in a synchronized manner to complement the directional control effects thereof. Enhanced control over the separation of unburned hydrocarbons from the remainder of the exhaust is thus provided. The hydrocarbons may be directed through the exhaust chamber and the other exhaust gases may be directed through pipe 18 as an alternate method of operation in this embodiment also.

With reference to FIGS. 7 and 8, an embodiment of the invention is disclosed which makes it possible to not only separate the hydrocarbon-rich gases from the other exhaust gases but to maintain complete separation of the gases at all times during operation of the engine. The figures show a cylinder head 10 as before including an exhaust chamber 11. In this embodiment chamber 11 is divided into two parts, such as lower and upper chambers 11a and 11b respectively by an apertured dividing means such as shoulder 50. Upper chamber 11b corresponds to the first collector means for collecting exhaust gases generally while lower chamber 11a corresponds to a second collector means. Shoulder 50 contains an annular opening 51 through which the stem 13 of valve 12 extends.

In addition to exhaust valve head 14, the valve carries an enlarged portion or supplemental head 52 which is adapted to close opening 51 when valve 12 is fully opened as shown in FIG. 8. When valve 12 is partially open as shown in FIG. 7, opening 51 is also open. When valve 12 is only partially open as during the terminal period of the exhaust valve stroke, the hydrocarbon-rich exhaust gases flow along the valve stem, into chamber 11b as illustrated and may be exhausted through a separate outlet port 17b. Very little gas remains in chamber 11a during this time. When the valve opening at inlet port 15 widens to a substantially fully open position, as shown in FIG. 8, supplemental head 52 closes opening 51 thus constraining the exhaust gases to chamber 11a. These gases may be exhausted through the separate outlet port 17a.

Having described the invention it should be understood that the structures shown may be modified without departing from the invention which is defined by the following claims.

I claim:

1. In an internal combustion engine, a cylinder head; a first exhaust collector means, including a first inlet port, associated with the cylinder head; and exhaust valve for opening and closing the first inlet port, and a second exhaust collector means, including a second inlet port, associated with the cylinder head; the second inlet port being disposed about the exhaust valve and arranged with respect to the first inlet port such that exhaust gases must pass through the first inlet port to be in a position to pass through the second inlet port.

2. The combination of claim 1 wherein the second collector means comprises a conduit means including an inlet end and the inlet end is disposed within the first collector means and substantially coaxially about the valve stem.

3. The combination of claim 2 wherein the second collector means includes an intermediate relatively small outlet opening communicating with the first collector means for allowing the flow of collimated exhaust gases from the second collector means to the first collector means.

4. The combination of claim 1 wherein the first collector means includes an exhaust outlet port and the second collector means comprises a conduit means with an inlet end disposed about the valve stem and an outlet end extending out of the exhaust outlet port.

5. The combination of claim 1 including a plurality of spaced deflection control port means disposed circumferentially near the first inlet port for applying relatively positive and negative pressures to the exhaust gases flowing therethrough whereby the flow of the gases may be selectively directed into or away from the first and second collector means, respectively.

6. The combination of claim 5 wherein the first collector means is a chamber in the cylinder head and the deflection control port means are disposed in the cylinder head wall immediately above the first collector inlet port.

7. The combination of claim 1 wherein the exhaust valve stem is hollow including an open upper end and a plurality of deflection control ports disposed circumferentially about the head of the exhaust valve and in communication with the hollow stem.

8. The combination of claim 1 wherein the first collector means is a chamber in the cylinder head, a plurality of spaced deflection control ports are disposed in the cylinder head immediately above the first collector inlet port for applying relatively positive and negative pressures to the exhaust gases flowing therethrough and the exhaust valve stem is hollow including an open upper end and a plurality of deflection control ports are disposed circumferentially about the head of the exhaust valve and in communication with the hollow stem for applying relatively positive and negative pressures to the exhaust gases flowing past the valve head.

9. The combination of claim 1 wherein the cylinder head includes an exhaust chamber; the second collector means includes an apertured divider positioned within the chamber so as to divide it into upper and lower chambers corresponding to the first and second collector means, respectively; an outlet means is included in both chambers; the valve stem extends through the aperture and the valve stem carries an enlarged portion so shaped and positioned with respect to the divider aperture as to close it when the valve is fully opened whereby the exhaust gases are constrained to the lower chamber during the intermediate portion of the exhaust valve stroke and to allow the flow of exhaust gases through the aperture particularly during the late period of the exhaust valve stroke.